US007017434B2

(12) United States Patent
Grundmann

(10) Patent No.: US 7,017,434 B2
(45) Date of Patent: Mar. 28, 2006

(54) SENSOR, PLURALITY OF SENSORS AND A METHOD FOR PRODUCING SAID SENSOR

(75) Inventor: Wolfgang Grundmann, Birkenwerder (DE)

(73) Assignee: Epcos AG, Munich (DE)

( * ) Notice: Subject to any disclaimer, the term of this patent is extended or adjusted under 35 U.S.C. 154(b) by 0 days.

(21) Appl. No.: 10/498,288

(22) PCT Filed: Dec. 2, 2002

(86) PCT No.: PCT/DE02/04402

§ 371 (c)(1),
(2), (4) Date: Aug. 20, 2004

(87) PCT Pub. No.: WO03/054484

PCT Pub. Date: Jul. 3, 2003

(65) Prior Publication Data

US 2005/0155442 A1 Jul. 21, 2005

(51) Int. Cl.
*G01K 1/08* (2006.01)
*G01D 21/00* (2006.01)
*B29C 45/00* (2006.01)

(52) U.S. Cl. .................... 73/866.5; 73/31.05; 425/542; 29/595

(58) Field of Classification Search ............... 73/23.31, 73/31.05, 866.5; 204/424, 431; 29/595
See application file for complete search history.

(56) References Cited

U.S. PATENT DOCUMENTS

| | | | | |
|---|---|---|---|---|
| 4,516,106 | A | 5/1985 | Nolting et al. | |
| 4,526,481 | A * | 7/1985 | Hansen | 374/144 |
| 4,869,218 | A | 9/1989 | Fehlmann et al. | |
| 5,733,044 | A | 3/1998 | Rose et al. | |
| 6,666,077 | B1 | 12/2003 | Bauer et al. | |
| 2001/0004845 | A1 | 6/2001 | Bauer et al. | |

FOREIGN PATENT DOCUMENTS

| | | |
|---|---|---|
| DE | 31 34 166 | 1/1983 |
| DE | 36 20 246 | 12/1987 |
| DE | 37 39 198 | 3/1989 |
| DE | 195 34 887 | 3/1997 |
| DE | 197 12 436 | 10/1998 |
| DE | 199 62 623 | 7/2001 |
| GB | 1 461 574 | 1/1977 |

* cited by examiner

*Primary Examiner*—Daniel S. Larkin
(74) *Attorney, Agent, or Firm*—Fish & Richardson P.C.

(57) ABSTRACT

A sensor includes a sensor body with a head having a cavity, a sensor element in the cavity, and a base at a foot of the sensor body. The base has a flange and a protective element of the flange. A thickness of the base, including the protective element, is greater than a width of the cavity.

9 Claims, 2 Drawing Sheets

SENSOR, PLURALITY OF SENSORS AND A METHOD FOR PRODUCING SAID SENSOR

A BACKGROUND

The invention relates to a sensor having a sensor body at the head of which a sensor element is located in a cavity. A flange is located at the foot of the sensor body. The invention also covers a plurality of sensors and a method for manufacturing a sensor.

Sensors as mentioned above are known from the state of the art in which the flange at the foot of the sensor body is so thin that it fits into the cavity at the head of a second sensor. These sensors have the disadvantage that in case of a plurality of sensors arranged without any particular order in a container it can happen that the flange of a sensor is pushed into the head cavity of another sensor. This might result in damage to the sensor element located in the head cavity of the other sensor.

A SUMMARY

The present invention solves this problem by providing a sensor that can be arranged with many others, without any particular order, where there is no risk that the flange of one sensor is pushed into the head cavity of another sensor.

Advantageous embodiments of the sensor, a plurality of sensors, and a method for manufacturing the sensor are described herein.

A sensor that has a sensor body is shown. The sensor body may be long and extended. At the head of the sensor body there is a cavity in which a sensor element is arranged. The sensor element may, for example, be an NTC temperature sensor. At the foot of the sensor body there is a base. The base has a flange. The base also has a protective element arranged on the flange. The thickness of the flange is less than the width of the cavity at the head. The thickness of the base is greater than the width of the cavity at the head.

The sensor has the advantage that the base, which is thicker than the width of the cavity at the head and contains the flange, prevents the flange from being inserted into the cavity at the head of another sensor, because, in order to insert the flange, which is part of the base, into the cavity of another sensor, the entire base of the sensor would have to be inserted into the cavity. Since the thickness of the base is greater than the width of the cavity, this is normally not possible.

Furthermore, a sensor is shown, in which the protective element is a yoke running from the outer region of the flange to the sensor body, which defines a cavity in the base.

Such a protective element can be manufactured easily and inexpensively, for example by injection molding. Since the base is not solid because of the cavity defined by the yoke, it is also possible to save material and therefore weight in making the sensor.

The sensor may be manufactured in an advantageous embodiment by injecting a plastic into an injection mold. This manufacturing process is particularly inexpensive and allows the manufacture of large unit numbers at relatively low expense.

Furthermore, a sensor is shown, in which the cavity in the sensor body and the cavity in the base run inward from the same side of the sensor body.

Such a sensor has the advantage that during manufacture by injection molding, the cavities can be formed by projections integrated inside into a part of the injection mold. The use of slide valves can be dispensed with. This advantageous mold design simplifies the manufacture of the sensor by injection molding.

It is also possible to provide lockable arms on the side of the sensor body, with a free space between each lockable arm and the sensor body that allows the lockable arm to be flexed back. In an advantageous embodiment, the lockable arms may be flexible, thereby allowing the sensor to interlock with the edge of a housing. In this case, the free spaces run inward from the same side of the sensor body as the cavity.

This again has the advantage of a simple manufacturing process for such a sensor by injection molding, with no need for the insertion of slide valves during the injection process.

Furthermore, a sensor is shown in which connecting wires hold the sensor element in place in the cavity at the head of the sensor body. Such a simple attachment, which does not have to be very stable mechanically and which allows the use even of relatively thin connecting wires, is made possible by the base of the sensor which prevents the stand-alone flange from penetrating into the cavity, thereby also forestalling any damage if the sensor element is moved away or torn off.

The invention also describes a plurality of sensors present without any particular order. Such a plurality of sensors may be arranged, without a problem, in no particular order, since the thick base reduces the risk of damage to the sensor element.

Furthermore, a method for manufacturing a sensor is shown, wherein the sensor is manufactured by injecting a plastic into a mold made up of two halves. The cavity at the head of the sensor body and the cavity in the base of the sensor are formed by projections firmly integrated into one of the two halves of the injection mold. These projections penetrate into the injection-molded plastic and in this way form the cavities.

In the following, the invention is explained in more detail by way of exemplary embodiments and their respective illustrations.

A DESCRIPTION OF THE DRAWINGS

A DETAILED DESCRIPTION

Figure 1:
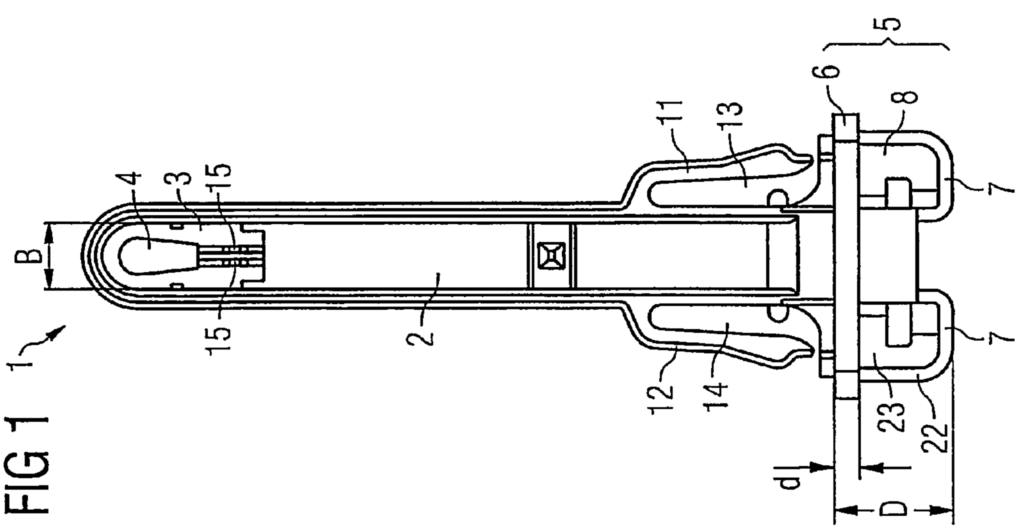
FIG. 1 shows an example of a sensor in a first side view.

FIG. 1 shows a sensor that has a sensor body 2. At the head of the sensor body 2 there is a cavity 3. In the cavity 3 there is a sensor element 4. The sensor element 4 is held in place in the cavity 3 by connecting wires 15. At the foot of the sensor 1 is a base 5. The base 5 comprises a flange 6. The flange 6 has a thickness d. The thickness d is less than the width B of the cavity 3 at the head of sensor 1. If no further precautions were taken, this would hold the risk that another sensor 16 with its flange 6 is pushed into the cavity 3 of the first sensor 1, forcing the sensor element 4 to the side or damaging it (see also FIG. 2). The base 5 furthermore comprises protective elements 7, 22 arranged on the flange 6 on both sides of the sensor body 2. The protective elements 7, 22 are designed in the form of yokes going from the end of the flange 6 to the sensor body 2. In doing so, they define cavities 8, 23 in the base 5. The thickness D of the base 5 is greater than the width B of the cavity 3 at the head of the sensor 1. This prevents the flange 6 of another sensor 16 from being forced into the cavity 3 of the sensor 1, thereby damaging the sensor element 4.

On both sides of the sensor body 2, there are locking elements 11, 12, which are flexible. Between the locking elements 11, 12 and in the sensor body 2 there are free spaces 13, 14 that allow the locking elements 11, 12 to flex back. The cavity 3 at the head of sensor 1, the free spaces 13, 14 on the locking elements 11, 12, and the cavities 8 that are defined by the protective elements 7, all run inward from the same side of the sensor body 2, making it relatively easy to manufacture them by injection molding (see also FIG. 3). The sensor body 2 may preferably be made of PVC, polypropylene or also polyamide.

Figure 2:
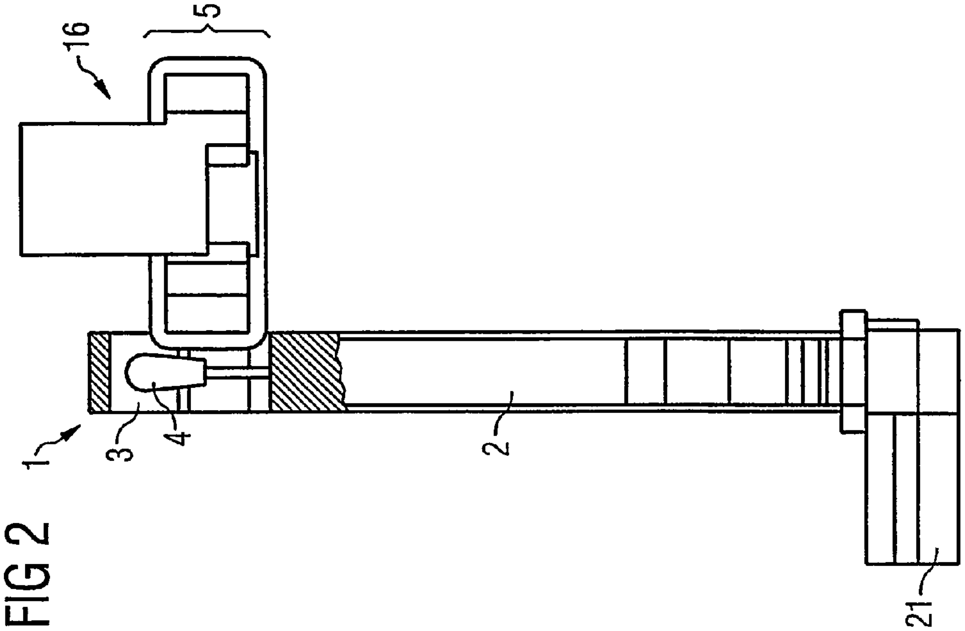
FIG. 2 shows examples of two sensors lying next to each other, in a side view.

FIG. 2 also shows a plug 21 arranged at the foot of the sensor 1. The plug 21 is connected to the sensor element 4 via connecting wires 15, in an electrically conductive manner. FIG. 2 also shows a second sensor 16 whose base 5 rests on the cavity 3 of the first sensor 1. Based on geometry, neither the base 5 of the second sensor 16 nor the flange at the foot 5 of the second sensor 16 can penetrate into the cavity 3 of the first sensor, thereby effectively protecting the sensor element 4 of the first sensor 1.

Figure 3:
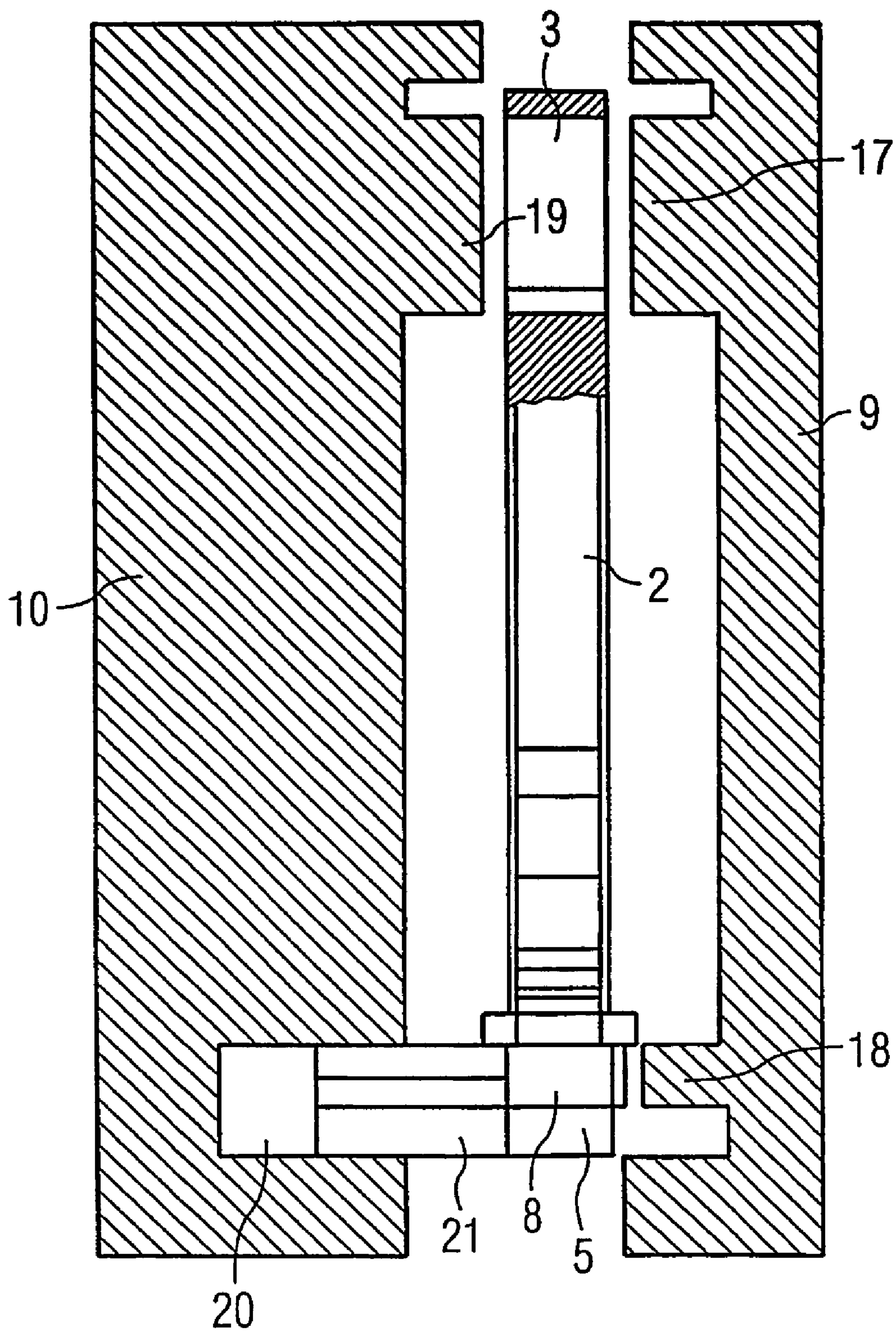
FIG. 3 shows an example of a sensor body and its manufacture by injection molding.

FIG. 3 shows the manufacture of a sensor body 2 having a cavity 3 at the head of the sensor body 2 and a cavity 8 in the base 5 of the sensor body 2. Two injection molds 9, 10 are used for the manufacture, which are joined together and form a cavity that is filled with plastic for manufacturing the sensor body 2 by injection molding. The injection mold 9 has a projection 17 at the site of cavity 3, which is integrated into the injection mold 9. The injection mold 9 also has another projection 18 at the site of cavity 8, which is meant for forming cavity 8. The injection mold 10 also has another projection 19 at the site of cavity 3, which is meant for forming cavity 3. The injection mold 10 also has a recess 20 provided for forming plug 21. The two injection molds 9, 10 are pushed together and thereby form the cavity necessary for forming the sensor body 2.

The projections 17, 19 may also occur in only one of the injection molds.

What is claimed is:

1. A sensor comprising:

a sensor body comprising a head having a cavity;

a sensor element in the cavity; and a base at a foot of the sensor body, the base comprising a flange and a protective element on the flange;

wherein a thickness of the flange is less than a width of the cavity, and wherein a thickness of the base is greater than the width of the cavity.

2. The sensor of claim 1, wherein the protective element comprises a yoke running from the flange to the sensor body, the yoke defining a second cavity in the base.

3. The sensor of claim 1, further comprising:

a second protective element on a side of the sensor body substantially opposite the protective element.

4. The sensor of claim 1, wherein the sensor comprises an integrated component that is manufactured by injecting plastic into an injection mold.

5. The sensor of claim 2, wherein the cavity and the second cavity run inward from a same side of the sensor body.

6. The sensor of claim 1, further comprising:

lockable arms on a side of the sensor body, the lockable arms and the sensor body defining a space, the space running inward relative to the sensor body.

7. The sensor of claim 1, further comprising:

wires that hold the sensor element in place in the cavity.

8. A plurality of sensors according to claim 1, the plurality of sensors being arranged together, wherein protective elements of the plurality of sensors prevent incursion into cavities of the plurality of sensors that hold sensor elements.

9. A method of manufacturing a sensor comprised of a sensor body comprising a head having a first cavity, a sensor element in the first cavity, and a base at a foot of the sensor body, the base comprising a flange and a protective element on the flange, where a thickness of the base is greater than a width of the first cavity, the method comprising:

injecting plastic into an injection mold having projections that are shaped to form the first cavity and to form a second cavity in the base.

* * * * *

UNITED STATES PATENT AND TRADEMARK OFFICE

CERTIFICATE OF CORRECTION

PATENT NO. : 7,017,434 B2
APPLICATION NO. : 10/498288
DATED : March 28, 2006
INVENTOR(S) : Wolfgang Grundmann It is certified that error appears in the above-identified patent and that said Letters Patent is hereby corrected as shown below:

On Title Page Item (63)

Insert -- Foreign Application Priority Data:

Dec. 6, 2001 (DE) .................. 101 59 871.8--

Signed and Sealed this

Nineteenth Day of December, 2006

JON W. DUDAS
*Director of the United States Patent and Trademark Office*